United States Patent [19]

Saitoh et al.

[11] Patent Number: 4,730,289

[45] Date of Patent: Mar. 8, 1988

[54] MAGNETIC-OPTICAL DISC MEMORY SYSTEM AND APPARATUS FOR SWITCHING HEADER AND DATA INFORMATION

[75] Inventors: Atsushi Saitoh, Ichikawa; Toshimitsu Kaku, Sagamihara, both of Japan

[73] Assignee: Hitachi, Ltd., Tokyo, Japan

[21] Appl. No.: 818,684

[22] Filed: Jan. 14, 1986

[30] Foreign Application Priority Data

Jan. 23, 1985 [JP]  Japan .................................. 60-8980

[51] Int. Cl.$^4$ .................... G11B 11/00; G11B 15/087
[52] U.S. Cl. ...................................... 369/13; 360/114; 369/47
[58] Field of Search ............... 369/13, 47, 48; 360/48, 360/114; 369/275

[56] References Cited

U.S. PATENT DOCUMENTS

| | | | |
|---|---|---|---|
| 4,001,883 | 1/1977 | Strout et al. | 360/48 |
| 4,229,808 | 10/1980 | Hui | 360/48 |
| 4,279,004 | 7/1981 | Yamashita et al. | 360/48 |
| 4,310,861 | 1/1982 | Kashio | 360/50 |
| 4,367,497 | 1/1983 | Jenkins | 360/48 |
| 4,443,870 | 4/1984 | Hazel et al. | 363/275 X |
| 4,466,026 | 8/1984 | Miura et al. | 360/61 |
| 4,535,439 | 8/1985 | Satoh et al. | 369/275 |

Primary Examiner—Raymond F. Cardillo
Assistant Examiner—Hoa T. Nguyen
Attorney, Agent, or Firm—Antonelli, Terry & Wands

[57] ABSTRACT

A magnetic-optical disc memory system wherein header information items which include sector marks indicating initial positions of sectors, track Nos., and sector Nos. are previously provided on a magnetic-optical disc in the form of embossed pits and wherein data information items are written in the form of magnetic signals in data areas other than the header areas. Photodetectors detect the header information and the data. The operation of switching outputs from the photodetectors is controlled in accordance with a timing based on the point of time at which a sector mark signal has been detected from the output of the photodetector which detects the header area.

4 Claims, 8 Drawing Figures

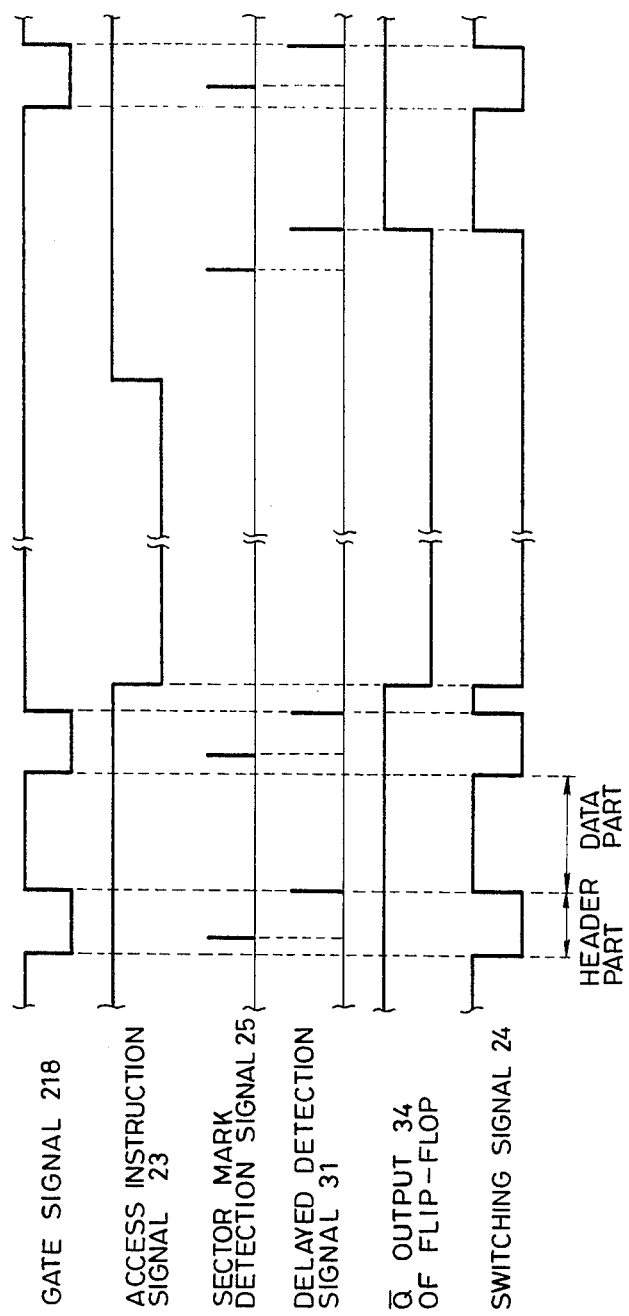

4,730,289

MAGNETIC-OPTICAL DISC MEMORY SYSTEM AND APPARATUS FOR SWITCHING HEADER AND DATA INFORMATION

BACKGROUND OF THE INVENTION

The present invention relates to a magnetic-optical disc memory system, and more particularly to a magnetic-optical disc file system which is well suited to stabilize a switching operation that is performed when a header signal and a data signal are detected by separate photodetection means and are switched and synthesized when writing or erasing data in a sector unit.

An example of a magnetic-optical information recording and reproducing system, in which data is written or erased by a thermomagnetic effect and is read out by a magnetooptical effect, has been proposed in 'Technical Report of Electronics and Communications Society (in Japan)' CPM 83-53, pp. 13-19. This system employs a recording medium in which data is written with a magnetic signal, while address information is written with a phase signal in the form of embossed pits. As regards a read-out signal detecting system, however, the proposal does not refer to a method of processing both the data and address information items, namely, switching them.

One of the inventors of the present invention has already proposed, with joint inventors who are not the inventors of the present invention, a magnetic-optical disc memory system in which detection means for a header signal and detection means for a data signal are disposed separately from each other and in which outputs of the detection means are added to each other in order to synthesize both the signals. The proposal is described in Japanese Patent Application Laid-open No. 136047 of 1985 (Japanese Patent Application No. 242006 of 1983) and corresponding U.S. Pat. application Ser. No. 685123. This proposal, however, refers to nothing of switching both the signals.

SUMMARY OF THE INVENTION

An object of the present invention is to provide a magnetic-optical disc memory system for writing or erasing data in a sector unit, which is capable of reliable switching processing in a case where header information given as phase information and data information given as magnetic information in the magnetic-optical disc memory system are detected by separate detection means and are thereafter switched and synthesized so as to process them as a series of information items.

In a magnetic-optical disc memory system according to the present invention, the header part of a magnetic-optical disc has an embossed face structure. The reproduction of the header part is performed by detecting the variation of the quantity of reflected light. The reproduction of the data part is performed in such a way that the direction of perpendicular magnetization is detected by utilizing a magneto-optical effect. In the magnetic-optical disc memory system according to the present invention, a detection system for reading the header part and a detection system for reading the data part are individually disposed. Output signals from the respective detection systems are selected by a switching circuit in correspondence with the header part and the data part, thereby to be controlled so as to form a series of information items. The switching circuit is started in accordance with a timing based on the point of time at which a sector mark has been recognized by directly supplying a sector mark detection circuit with the signal detected by the detection system for reading the header part.

BRIEF DESCRIPTION OF THE DRAWINGS

In the accompanying drawings;

FIG. 8 is a time chart showing operations in FIG. 7.

DETAILED DESCRIPTION OF THE INVENTION

Figure 1:
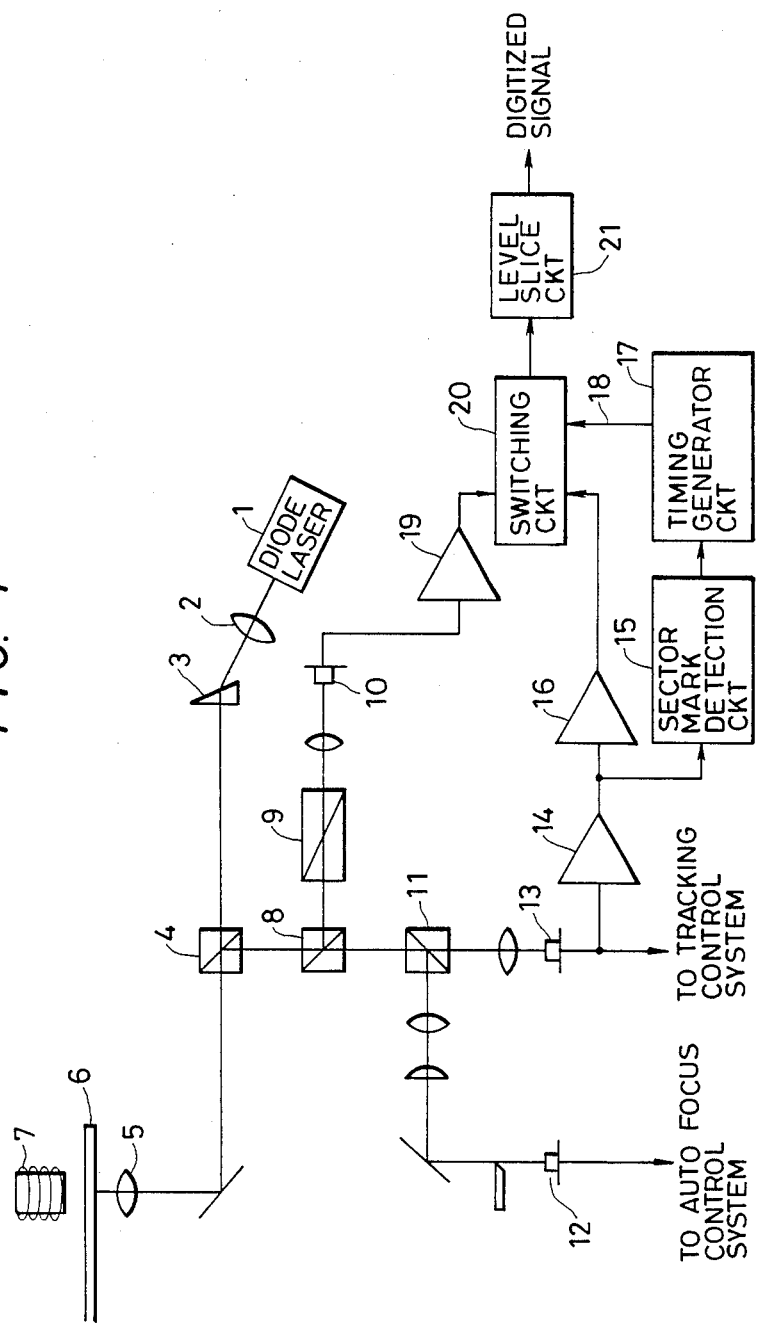
FIG. 1 is a diagram showing a first embodiment of a magnetic-optical disc memory system according to the present invention.

In a magnetic-optical disc, a header part is provided with controlling information in the form of embossed pits for the purpose of writing, reading out or erasing data in a sector unit. The header part is constructed of a sector mark for recognizing the initial position of a sector, a track number and a sector number for indicating the address of the sector, a clock synchronizing signal, an error correction signal, etc. On the other hand, a data part ranges between a first header part and the next header part. In the present invention, since a header reading detection system and a data reading detection system are separately comprised, a means needs to be used for adjusting the levels of the signals of both the detection systems and for selecting the signal from either detection system in correspondence with each part.

In a case where different kinds of signals such as a phase signal and a magnetic signal are detected by individual detection systems and then handled as a series of information items, the operations of switching both the signals and thereafter synthesizing them by any methods are required. For the control of the switching operation, several methods as described below are considered.

For example, the surface of the disc is formed with encoded signals (embossed patterns) for rotation control, and the encoded signals are detected. Here, when the numbers and positions of the encoded patterns are brought into correspondence with the respective sectors on the disc beforehand, it is possible to recognize the header part and the data part on the basis of timings from the edge of the encoded signal and to operate a switching circuit so as to switch and synthesize the detection signals from photodetectors separate from each other. This method, however, is unsuitable on account of such severe conditions that the encoded patterns and the positions of the respective sectors must correspond exactly and that the operation of a timing generator circuit must be stably performed without being affected by temperature characteristics etc.

Considered as another method is an expedient wherein the sector mark is detected from a signal obtained from the output of a switching circuit for the switching and synthesis and wherein the header part and the data part are switched according to a timing based on the detection of the mark. This method performs the switching operation of the switching circuit in accordance with its own timing based on the signal. When a certain track is being steadily read out, the switching operation is normally performed. However, when the quantity of light projected on the disc has increased as in a writing or erasing mode, or when access is to be done from a certain track to another track, the sector mark and the header signal cannot be detected. Therefore, when the above process is performed with the change-over switch thrown on the data part side having no address information, a signal for throwing the change-over switch back to the header part side is not obtained, so that a malfunction occurs to make the continuation of subsequent processes impossible.

According to the present invention, the photo-detection signal on the header detection side is directly applied to a sector mark detection circuit before entering the change-over switch, and the change-over switch is operated according to a timing based on the generation of a mark detection signal indicating that the sector mark has been detected. Accordingly, the sector mark can be reliably detected after the end of the access to another track. Therefore, the disadvantage stated above can be solved.

According to another embodiment of the present invention, when starting an access process, the change-over switch is set forcibly so as to allow only the photo-detection signal on the header detection side to pass through the switch, whereupon the access is executed, and when the target track has been reached, the switching operation is performed in correspondence with the header part or the data part again. In this case, the sector mark is detected at a stage posterior to the switching circuit, and even when the change-over switch is operated according to a timing based on a mark detection signal, processes can be continued normally.

DETAILED DESCRIPTION OF THE PREFERRED EMBODIMENTS

Now, embodiments of the present invention will be described. A first embodiment is illustrated in FIG. 1. This figure is a diagram showing the schematic arrangement of a magnetic-optical disc memory system according to the present invention, and showing parts of a magnetic-optical head and signal detecting and processing systems for a magnetic-optical disc. A light beam emitted from a diode laser 1 is turned by a collimating lens 2 into a collimated beam, which is transformed by a triangular prism 3 into a beam which has a circular light intensity distribution in section. After passing through a beam splitter 4, the beam is focused as a minute spot on a disc 6 provided with a recording film (perpendicular magnetic film), by a focusing lens 5. An electromagnetic coil 7 establishes a magnetic field for writing or erasing. Information is read out by detecting the Kerr rotation of reflected light. The reflected light from the disc 6 passes through the focusing lens 5 again, and is thereafter reflected by the beam splitter 4. The reflected light is further reflected by a beam splitter 8 and then passed through an analyzer 9, and the analyzed light is led via a lens to a photodetector 10, by which magnetic information and header information are detected.

It is convenient that the header information is previously provided in the form of embossed pits when the disc is fabricated. The reason is that the header information signifies information items such as sector marks which serve for recognizing the initial positions of respective sectors and clocking signals, track Nos. and sector Nos. which are required when decoding data, and that in general, a user need not alter the information items.

Light transmitted through the beam splitter 8 is branched by a beam splitter 11 into two parts, one of which is guided to a photodetector 12 for autofocus control and the other of which is guided to a photodetector 13 for tracking control. By way of example, the light reflected by the beam splitter 11 is passed through an astigmatic optical system consisting of a spherical lens and a cylindrical lens and is partly isolated by a knife edge, whereupon it is led to the photodetector 12 for detecting a focus error. On the other hand, the light transmitted through the beam splitter 11 is led via a spherical lens to the two-segmented photodetector 13 for detecting tracking errors.

The optical signal to be received by the photodetector 13 is a signal modulated with the magnitudes of the quantity of the reflected light from the disc 6. That is, the header information provided on the disc 6 in the form of the embossed pits can be detected, not only by the photodetector 10, but also by the photodetector 13. The signal light to fall on the photodetector 13 has not passed through the analyzer 9, and therefore has the merit that it is less liable to be affected by the retardation of the disc 6 and the disturbance of polarization caused by the distribution of magnetization. Accordingly, it is more preferable to employ the signal on the side of the photodetector 13 for the reading of the header information. Of course, the signal on the side of the photodetector 10 must be employed for the magnetic information because the rotation of a polarization plane is detected.

The laser radiation optical system, the magnetic signal detection system, the header signal detection system and the electromagnetic coil constitute a magneto-optical head. This magneto-optical head is so constructed as to be movable to any desired radial position of the disc 6 by means of a step motor or linear motor (not shown).

Figure 2:
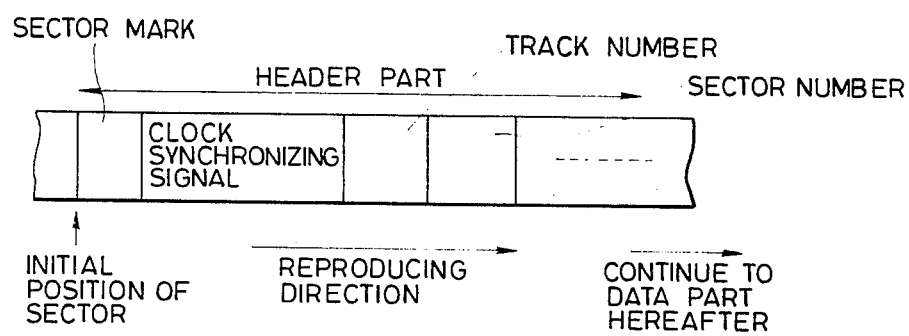
FIG. 2 is a diagram showing an example of the information format of a header part.

Here, the general format of the header information will be described. FIG. 2 shows an example of the format of the header information. Although header information items need not always be in the format and sequence as shown in FIG. 2 to the end of performing the present invention, only a sector mark should be provided at the initial position of a sector for convenience' sake. Further, the number of bits of each constituent of the header information may be as desired.

Next, there will be described a sector mark detection circuit system which forms the essential point of the present invention, and processing methods which concern the branching of the signal to this detection circuit system and the switching and synthesis between the magnetic information and the header information.

In the arrangement of FIG. 1, the optical signal received by the header signal detecting photodetector 13 is amplified to a proper level by an amplifier 14, and the amplified signal is branched to a sector mark detection circuit 15 and a variable-gain amplifier 16 for adjusting the level of the header signal to that of the signal of the magnetic information. When the sector mark has been recognized by the sector mark detection circuit 15, a signal 18 for the switching between a header part and a data part is generated by a timing generator circuit 17 which serves to determine the limits of the data part (the extent from the header part and the initial position of the next sector). On the other hand, the magneto-optical signal (data signal) received by the magnetic signal detecting photodetector 10 is amplified by an amplifier 19 and is thereafter sent to a switching circuit 20 for switching the header part and the data part. In response to the switching signal 18, the switching circuit 20 switches signals so as to pass the signal from the photodetector 13 as regards the header part and to pass the signal from the photodetector 10 as regards the data part. Thereafter, the output of the switching circuit 20 is processed by a level slice circuit 21, and the resulting digital signal is sent to the processing system of the next stage.

The foregoing is the first embodiment of the present invention, and the timing generator circuit 17 as well as the switching circuit 20 will now be somewhat described Since the sector mark detection circuit 15 itself is an already known circuit and does not require any special alteration in regard to the present embodiment, it shall be omitted from description.

Figure 3:
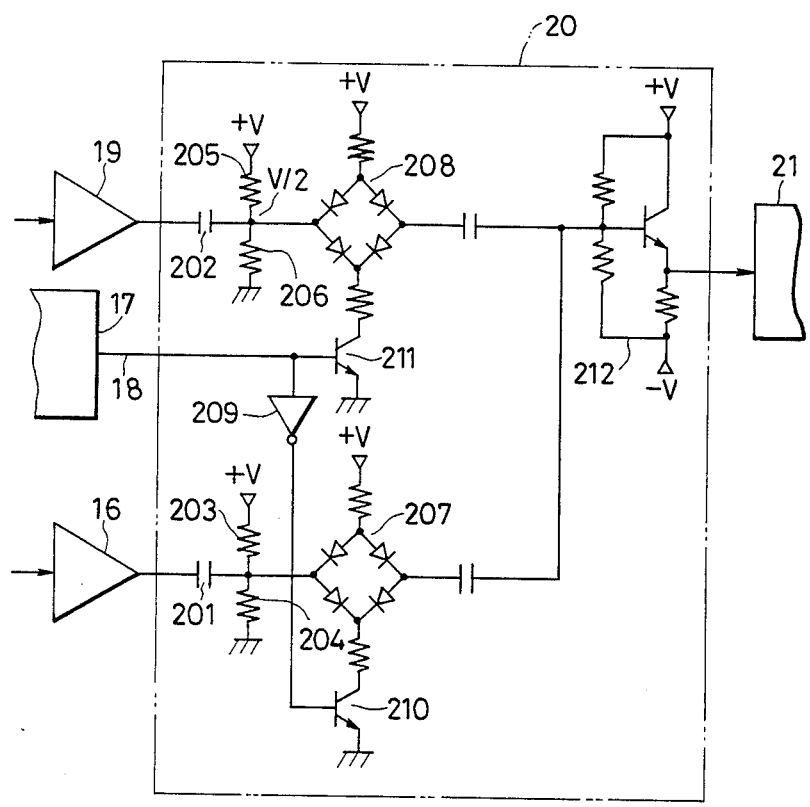
FIG. 3 is an arrangement diagram of a switching circuit for the header part and a data part.

FIG. 3 shows an example of the switching circuit 20. The signals amplified by the header signal side amplifier 16 and the magnetic signal side amplifier 19 have direct currents cut by capacitors 201 and 202, respectively. They are thereafter turned by resistors 203, 204 and resistors 205, 206 into signals which center round a middle point potential V/2 and which are input to diode switches 207 and 208, respectively. The diode switches are turned 'on' and 'off' by the switching signal 18 from the timing generator circuit 17.

When the signal 18 from the timing generator circuit 17 is at a "low" level, an inverter 209 renders the base of a transistor switch 210 a high level to turn "on" this transistor switch, so that the diode switch 207 is enabled. Meantime, the base of a transistor switch 211 is at the low level, so that the diode switch 208 is disabled. Accordingly, only the header signal is sent to the next stage. Conversely, when the signal 18 from the timing generator circuit 17 is at a "high" level, the diode switch 207 is disabled, and the diode switch 208 is enabled. Therefore, only the data signal is sent to the next stage. The signal selected by the diode switch passes through a buffer circuit 212, and is thereafter sent to the level slice circuit 21. The buffer circuit 212 is intended to lower the output impedance of the switching circuit 20 and to stably transmit the signals. Although it is illustrated as an emitter follower circuit by way of example, it may well be another circuit having the same effect.

In FIG. 3, the timing generator circuit 17 receives the sector mark detection signal generated and defines the limits of the data part with a counter. That is, it counts fixed numbers of clocks, thereby to generate the digital gate signals of the "low" level for the header part and the "high" level for the data part by way of example. Of course, even when the "high" level is output for the header part and the "low" level for the data part, a similar operation can be executed by reversing the operation of the switching circuit 20.

Figure 4:
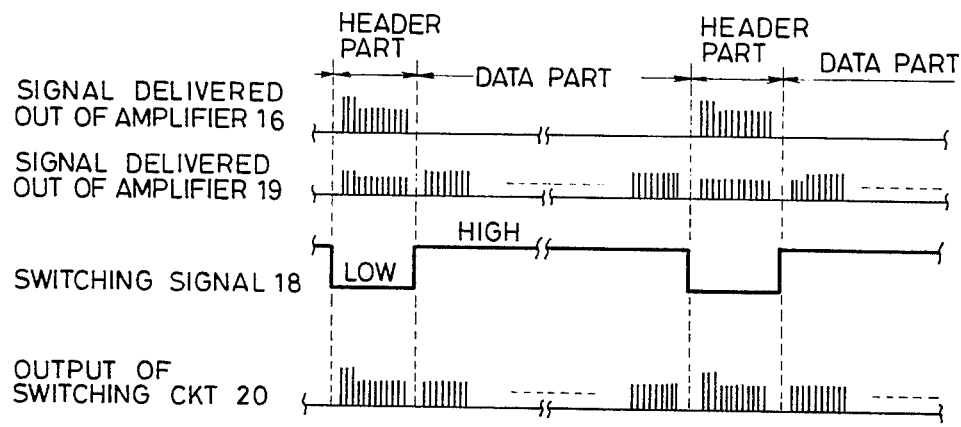
FIG. 4 is a diagram showing input signals to and an output signal from the switching circuit and the switching operation of the switching circuit.

FIG. 4 shows the switching signal 18 produced by the timing generator circuit 17, and the situation of the switching between the header part and data part signals.

While the switching circuit 20 in the present embodiment has been exemplified as the arrangement composed of the diode switches 207 and 208, it may well be constructed of analog switches of high speed. In this regard, the period of time required for the switching needs to be selected in consideration of the data transfer rate of the system. For example, in a case where the transfer rate is on the order of several hundred kilobytes per second, the switching speed needs to be below one hundred nanoseconds. The switching period of time is experimentally determined, and is finally judged on the basis of verification with the actual signal processing circuit.

Figure 5:
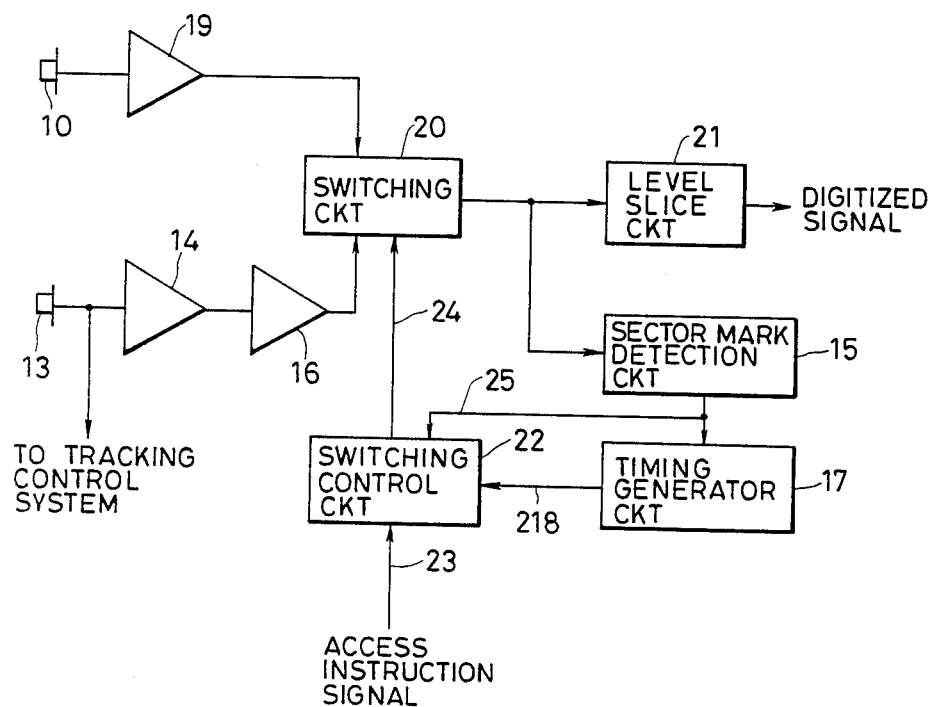
FIG. 5 is a diagram showing a second embodiment of the present invention.

Next, a second embodiment of the present invention will be described. FIG. 5 shows the photodetectors and signal processing as a block diagram. The arrangement before the photodetectors 10 and 13 in FIG. 1 applies also to the second embodiment, and is not illustrated.

Referring to FIG. 5, the magnetic information of the data part received by the photodetector 10 is amplified by the amplifier 19. On the other hand, the phase information of the header part received by the photodetector 13 is amplified by the amplifier 14, and the level of the amplified signal is thereafter adjusted to the level of the magnetic information by the variable-gain amplifier 16. Both the signals are selected by the switching circuit 20. The output of the switching circuit 20 is, on one hand, processed and digitized by the level slice circuit 21. On the other hand, it is branched to the sector mark detection circuit 15. When the sector mark in the header part has been detected, a gate signal 218 for switching the header part and the data part is output by the timing generator circuit 17. Meanwhile, the instruction of the access operation ought to be issued from an upper controller (control unit). Therefore, a switching control circuit 22 is so operated that the signal from the side of the photodetector 13 passes through the switching circuit 20 and enters the level slice circuit 21 as well as the sector mark detection circuit 15 at the posterior stage without fail during the period of time from the issue of the access instruction signal 23 until the end of the access operation. When the access instruction signal 23 has stopped, the switching control circuit 22 is reset so as to operate the switching circuit 20 in accordance with the gate signal 218 from the timing generator circuit 17 again. Here, reference will be had to a time chart concerning the parts which are not included in the first embodiment and which are added in the second embodiment, namely, the access instruction signal 23, the gate signal 218, a switching signal 24, and the input/output signals of the switching circuit 20.

Figure 6:
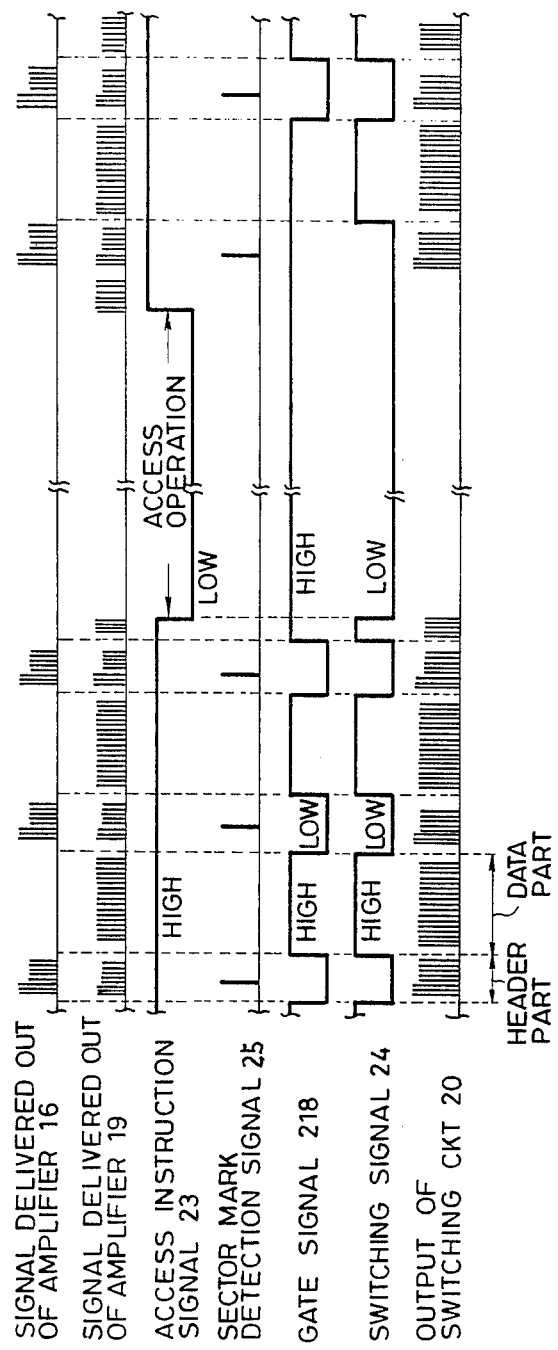
FIG. 6 is a time chart showing the operations of switching and synthesizing signals according to the arrangement of FIG. 5.

FIG. 6 is the time chart showing the operations pertinent to the second embodiment. In FIG. 6, the signal 23 is rendered the "high" level in the absence of the access instruction. When the access instruction signal 23 is at the "high" level, the gate signal 218 is generated by the timing generator circuit 17 in accordance with the timing based on the time of generation of a sector mark detection signal 25, as the "low" level for the header part and the "high" level for the data part, whereby the ordinary switching operation is performed. Assuming the access instruction has been given, at this time, the access instruction signal 23 changes from the "high" level to the "low" level. Simultaneously, the switching signal 24 is forcibly dropped to the "low" level irrespective of the state of the gate signal 218. Accordingly, the switching circuit 20 is selected so that only the signal on the header part reading photodetector side may pass therethrough at all times. After the end of the access operation and the return of the access instruction signal 23 to the "high" level and the first sector mark has been detected, the ordinary switching operation before the access is repeated again.

Figure 7:
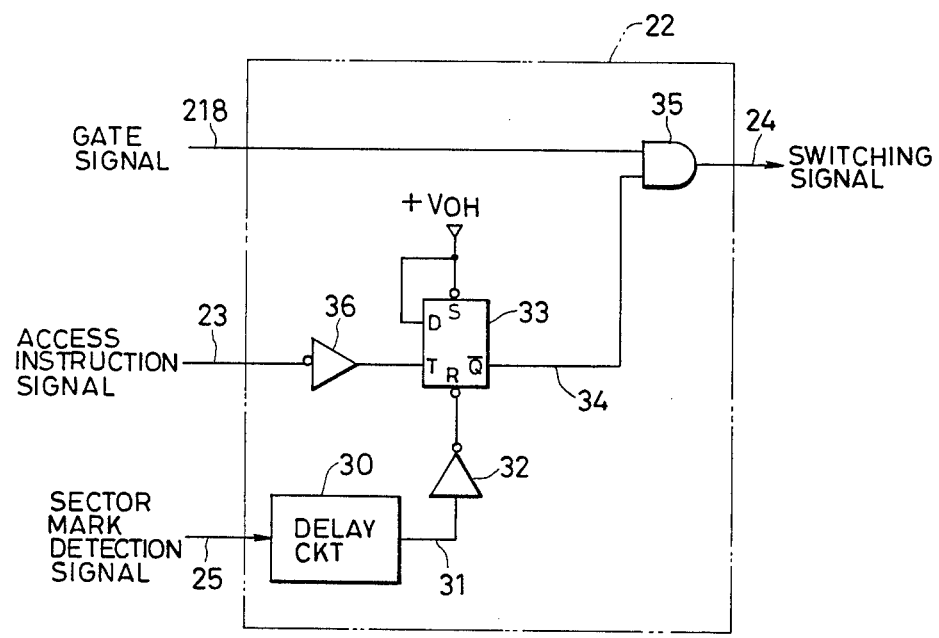
FIG. 7 is a diagram showing an example of arrangement of a switching control circuit.

FIG. 7 is a diagram showing an example of arrangement of the switching control circuit 22. In the figure, numeral 30 designates a delay circuit which utilizes a counter. When supplied with the sector mark detection signal 25, the delay circuit 30 delivers a detection signal 31 which is delayed by a time interval until the initial position of the data part succeeding the header part. Since the delayed detection signal 31 is input to the reset (R) terminal of a flip-flop 33 through an inverter 32, the e,ovs/Q/ output 34 of the flip-flop 33 is held at the "high" level. Accordingly, in the state in which the sector mark is detected, one input 34 of an AND circuit 35 is at the "high" level, so that the gate signal 218 is delivered as the switching signal 24 as it is.

If the access operation has started, the access instruction signal 23 becomes the "low" level which is passed through an inverter 36, and the "high" level is applied to the trigger (T) input of the flip-flop 33. Here, the D input and set (S) input of the flip-flop 33 are pulled up to the "high" level ($V_{OH}$). Therefore, the e,ovs/Q/ output of the flip-flop becomes the "low" level in response to the rise of the T input. Accordingly, even when the level of the gate signal 218 is the "high" level, the switching signal 24 is forced to become the "low" level, and hence, the switching circuit 20 is set so as to pass the signal on the header part detection side therethrough. When, after the end of the access operation, the sector mark detection signal 25 has been detected, the switching circuit 20 is reset again to the ordinary switching operation corresponding to the header part and the data part. While the flip-flop 33 included in the present embodiment is a D-type flip-flop, it may well be a flip-flop of a different type. Besides, whether or not the inverters 32 and 36 are inserted is determined in consideration of the operation of the flip-flop to be used.

FIG. 8 shows the logic operations of the switching control circuit 22 in FIG. 7 in correspondence with the above description.

In a case where a magnetic-optical disc of the type in which header parts are provided on the disc in the form of embossed pits, while data parts are written in magnetic directions, is handled in a magnetic-optical disc file system in which a header part reading photodetector and a data part reading photodetector are separately disposed, one embodiment of the present invention controls the timings at which signals from both the detectors are switched and synthesized, on the basis of the signal which is applied directly from the header part reading photodetector. Thus, according to the present invention, even when the reading of the header part is interrupted by an access operation and the system is reset again, the switching operation is promptly restarted, and hence, data can be stably and reliably written, read out and erased in sector unit. In addition, according to another embodiment of the present invention, the timing of the switching is based on a sector mark which is detected from a signal having passed through a change-over switch circuit, but the change-over switch is forcibly set so as to infallibly pass the signal from the header reading photodetector during the access operation only and is reset to the ordinary switching operation at the time of the end of the access, whereby a similar effect can be achieved.

We claim:
1. A magnetic-optical disc memory system wherein header information items including sector marks indicative of initial positions of sectors, track numbers and sector numbers are written at predetermined areas on a magnetic-optical disc in the form of embossed pits and wherein data information items are written in the form of magnetic signals in areas other than the predetermined areas on the magnetic-optical disc for the header information items; said system comprising:
   means to detect the header information;
   means to detect the date information;
   means to detect sector marks from an output of the header information detection means; and
   a switching circuit for selecting one of the header information and the data information based on a sector mark detection signal generated from the secotr mark detection means.

2. A magnetic-optical disc memory system according to claim 1, wherein said system further comprises a control circuit means to set said switching circuit when moving a position of a light spot which is applied to the magnetic-optical disc for obtaining the header information and the data information from one track to another track such that only an output of said header information detection means passes through said switching circuit; the setting of said switching circuit being released upon the detection of a sector mark after moving the position of the light spot to said another track.

3. A magnetic-optical disc memory system according to claim 2, wherein the sector mark is detected by the sector mark detection means at a stage posterior to said switching circuit.

4. A magnetic-optical disc memory system according to claim 2, wherein said control circuit means comprises a delay circuit which delays said sector mark detection signal; a flip-flop circuit which is controlled by an output of said delay circuit and an access instruction signal; and an AND circuit which is supplied with an output of said flip-flop circuit and a gate signal for controlling the switching operation of said switching circuit.

* * * * *